US011981064B2

(12) United States Patent
Schlief et al.

(10) Patent No.: US 11,981,064 B2
(45) Date of Patent: May 14, 2024

(54) DIE PLATE HEATING/CHANGING SYSTEM AND METHOD FOR CHANGING PLATES IN A PELLETIZER

(71) Applicant: NORDSON CORPORATION, Westlake, OH (US)

(72) Inventors: Dirk Schlief, Dülmen (DE); Nikolai Schnellbach, Senden (DE)

(73) Assignee: Nordson Corporation, Westlake, OH (US)

( * ) Notice: Subject to any disclaimer, the term of this patent is extended or adjusted under 35 U.S.C. 154(b) by 130 days.

(21) Appl. No.: 17/613,139

(22) PCT Filed: May 27, 2020

(86) PCT No.: PCT/US2020/034612
§ 371 (c)(1),
(2) Date: Nov. 22, 2021

(87) PCT Pub. No.: WO2020/247215
PCT Pub. Date: Dec. 10, 2020

(65) Prior Publication Data
US 2022/0212391 A1 Jul. 7, 2022

Related U.S. Application Data

(60) Provisional application No. 62/856,271, filed on Jun. 3, 2019.

(51) Int. Cl.
*B29C 48/25* (2019.01)
*B29C 48/04* (2019.01)
(Continued)

(52) U.S. Cl.
CPC .......... *B29C 48/2562* (2019.02); *B29C 48/04* (2019.02); *B29C 48/2556* (2019.02); *B29C 48/2566* (2019.02); *B29C 48/265* (2019.02)

(58) Field of Classification Search
CPC ............ B29C 48/2562; B29C 48/2566; B29C 48/2556; B29C 48/04; B29C 48/265
See application file for complete search history.

(56) References Cited

U.S. PATENT DOCUMENTS

| 5,525,052 A | 6/1996 | Czarnetzki et al. |
| 2015/0132424 A1 | 5/2015 | Robertson et al. |

(Continued)

FOREIGN PATENT DOCUMENTS

| AU | 5642890 A | 11/1991 |
| CN | 104786465 A | 7/2015 |

(Continued)

OTHER PUBLICATIONS

JP2001088193A, Kobayashi, machine translation from ESpaceNet, accessed Jul. 10, 2023 (Year: 2001).*

(Continued)

*Primary Examiner* — Alison L Hindenlang
*Assistant Examiner* — Erica Hartsell Funk
(74) *Attorney, Agent, or Firm* — BakerHostetler

(57) ABSTRACT

A die plate changing system holds first and second die plates and selectively transitions the first and second die plates into and out of communication with a material source. The die plate changing system has a frame having a body defining a first recess that receives the first die plate and a second recess that receives the second die plate, where the frame is heats the first and second die plates when the first and second die plates are disposed in the first and second recesses, respectively. The die plate changing system also includes a movement assembly operably coupled to the frame and that selectively moves the frame between a first position, where the first die plate receives material from the material source, and a second position, where the second die plate receives the material from the material source.

22 Claims, 11 Drawing Sheets

(51) Int. Cl.
  *B29C 48/255*  (2019.01)
  *B29C 48/265*  (2019.01)

(56) References Cited

U.S. PATENT DOCUMENTS

| | | |
|---|---|---|
| 2019/0001527 A1 | 1/2019 | Lohse |
| 2019/0001528 A1 | 1/2019 | Lohse |
| 2021/0114259 A1* | 4/2021 | Fukuzawa ................. B29B 9/06 |

FOREIGN PATENT DOCUMENTS

| | | |
|---|---|---|
| CN | 108472853 A | 8/2018 |
| DE | 3243184 A1 | 5/1984 |
| EP | 0612559 B1 | 11/1997 |
| JP | 2001-088193 A | 4/2001 |
| JP | 2004-330433 A | 11/2004 |
| WO | 91/17034 A1 | 11/1991 |
| WO | 2017/108475 A1 | 6/2017 |

OTHER PUBLICATIONS

WO2017108475A1, Lohse, machine translation from ESpaceNet, accessed Jul. 10, 2023 (Year: 2017).*
IPEA/409—International Preliminary Report on Patentability dated Dec. 16, 2021 for WO Application No. PCT/US20/034612.
ISA/220—Notification of Transmittal or Search Report and Written Opinion of the ISA, or the Declaration dated Sep. 4, 2020 for WO Application No. PCT/US20/034612.

* cited by examiner

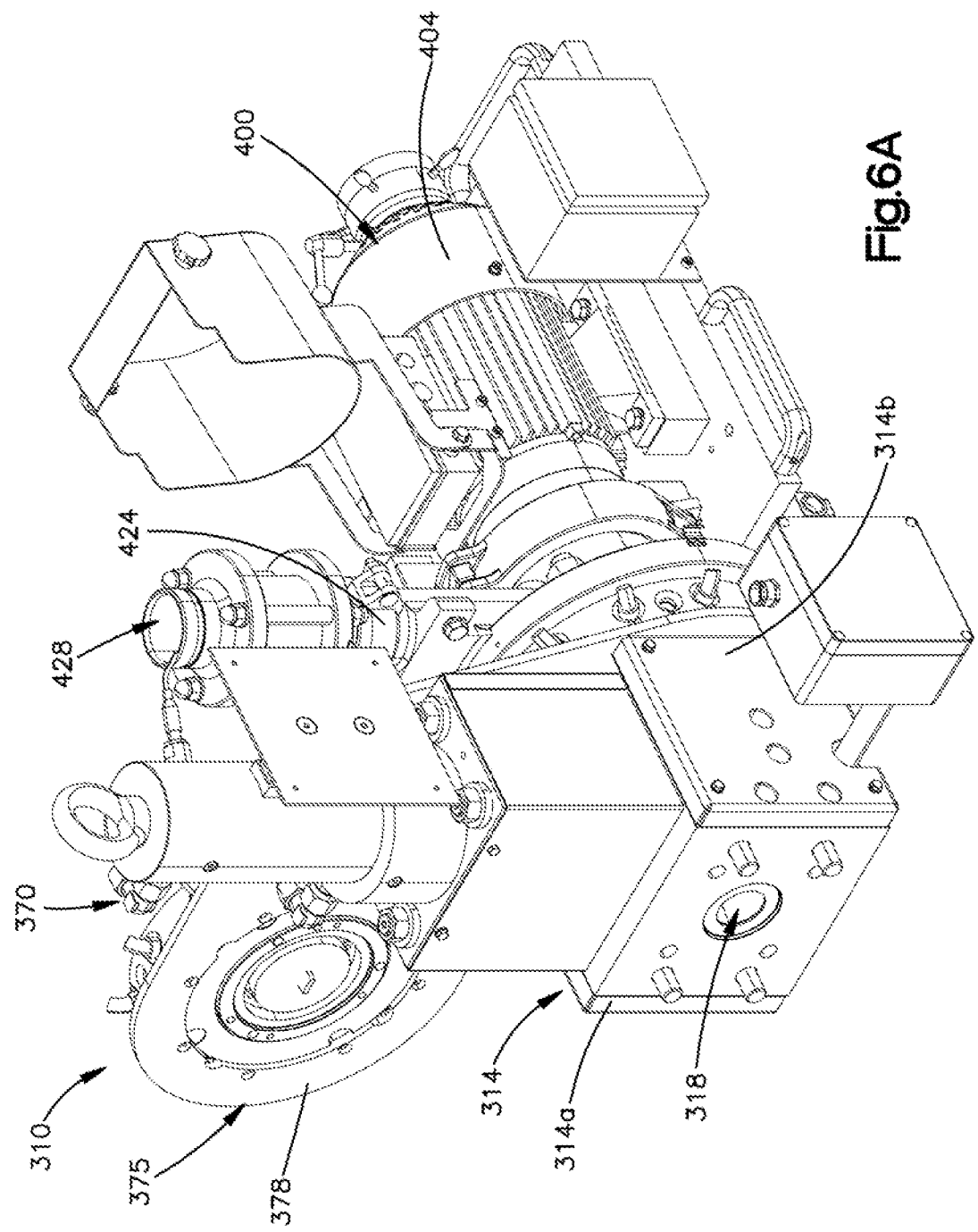

DIE PLATE HEATING/CHANGING SYSTEM AND METHOD FOR CHANGING PLATES IN A PELLETIZER

CROSS-REFERENCE TO RELATED APPLICATIONS

This application is a National Stage Application of International Patent App. No. PCT/US2020/034612, filed May 27, 2020, which claims the benefit of U.S. Provisional Patent App. No. 62/856,271, filed Jun. 3, 2019, the entire disclosures of both of which are hereby incorporated by reference as if set forth in their entirety herein.

TECHNICAL FIELD

The present disclosure generally relates to die plate changing systems, and more particularly to die plate changing systems configured to hold and heat two die plates in a pelletizing system.

BACKGROUND

Conventionally, pelletizing systems can be utilized to produce pellets of material from a molten stream of the material, which can be an adhesive. In such pelletizing systems, a diverter valve and a die plate are operably connected to a pelletizer. In such an arrangement, the die plate has a plurality of holes therein and is mounted between the diverter valve and the pelletizer, specifically at the entrance to the pelletizer. The pelletizer then includes a rotating cutting head having cutting blades positioned adjacent a face of the die plate, from which streams of molten material flow. The rotating cutting head cuts the streams of material into pellets of various sizes depending upon the extrusion flow rate through the holes in the die plate and the speed of rotation of the cutting head. The pellets can be received by a flow of water, which cools the pellets and serves to carry the pellets away from the pelletizing assembly.

During operation of pelletizing systems, it can become necessary to replace the die plate. This can be necessary in order to produce pellets of different sizes, perform routine maintenance, fix an issue affecting operation, etc. However, replacing a die plate can place a high burden on a pelletizing operation, as pellet production must stop, the pelletizing system at least partially disassembled, the currently used die plate removed, and a new die plate installed. Further, the new die plate must be heated after installation before a pelletizing operation can begin again. This further lengthens downtime between pelletizing operations and increases pellet production costs.

Therefore, there is a need for a die plate changing system capable of holding and heating two die plates in a pelletizing system.

SUMMARY

An embodiment of the present disclosure is a die plate changing system configured to hold first and second die plates and selectively transition the first and second die plates into and out of communication with a material source. The die plate changing system comprises a frame having a body defining a first recess configured to receive the first die plate and a second recess configured to receive the second die plate, where the first and second die plates are disposed in the first and second recesses, respectively, and are heated. The die plate changing system also includes a movement assembly operably coupled to the frame and configured to selectively move the frame between a first position, where the first die plate is configured to receive material from the material source, and a second position, where the second die plate is configured to receive the material from the material source.

Another embodiment of the present disclosure is a method of changing die plates in a pelletizing system. The method comprises heating a first die plate and providing a material to the first die plate when the frame is in a first position. The method also includes heating a second die plate, moving the frame from the first position to a second position, and providing the material to the second die plate.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In the drawings:

FIG. 6A is a perspective view of a pelletizing system according to another embodiment of the present disclosure;

DETAILED DESCRIPTION

Figure 1A:
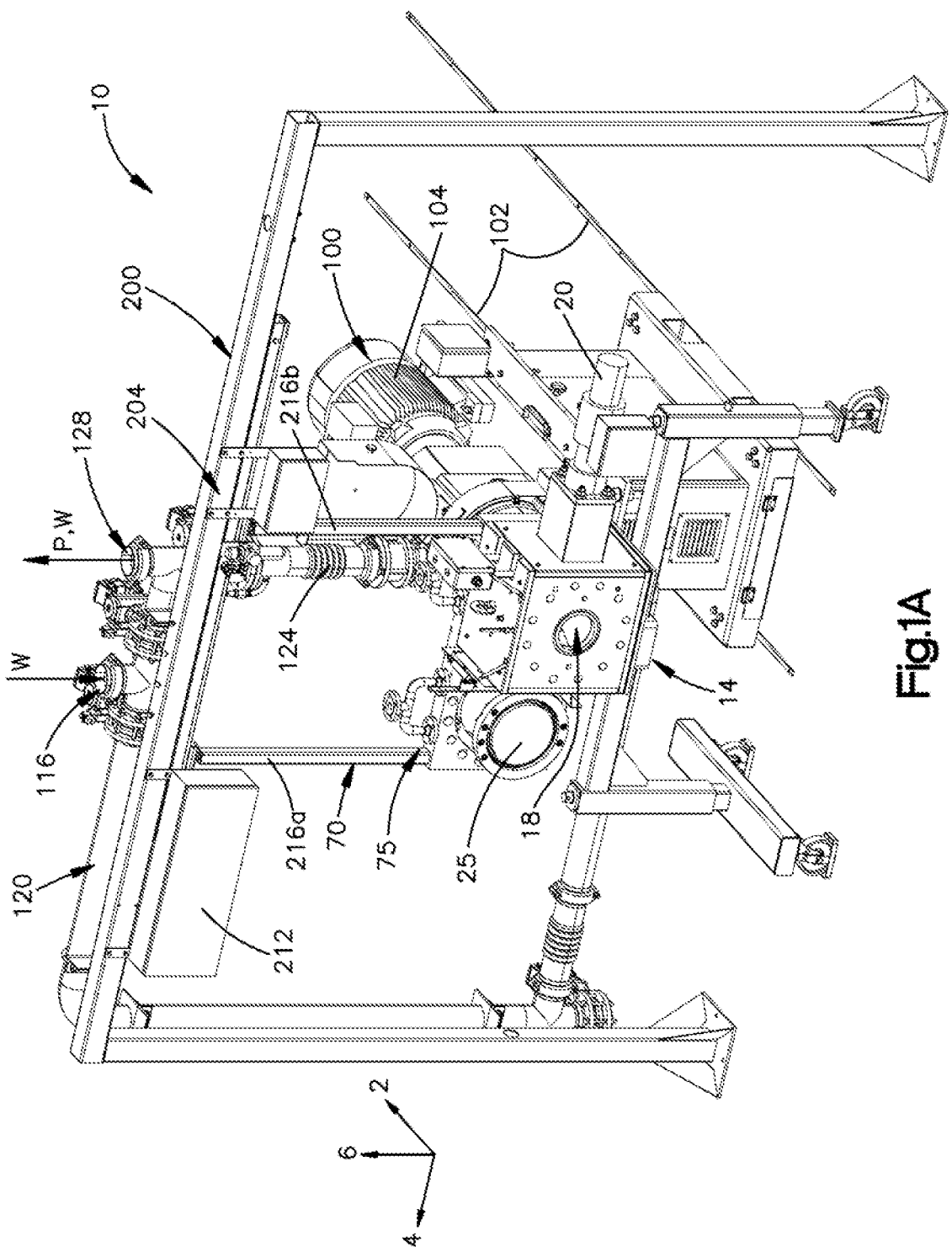
FIG. 1A is a perspective view of a pelletizing system according to an embodiment of the present disclosure.
Figure 1B:
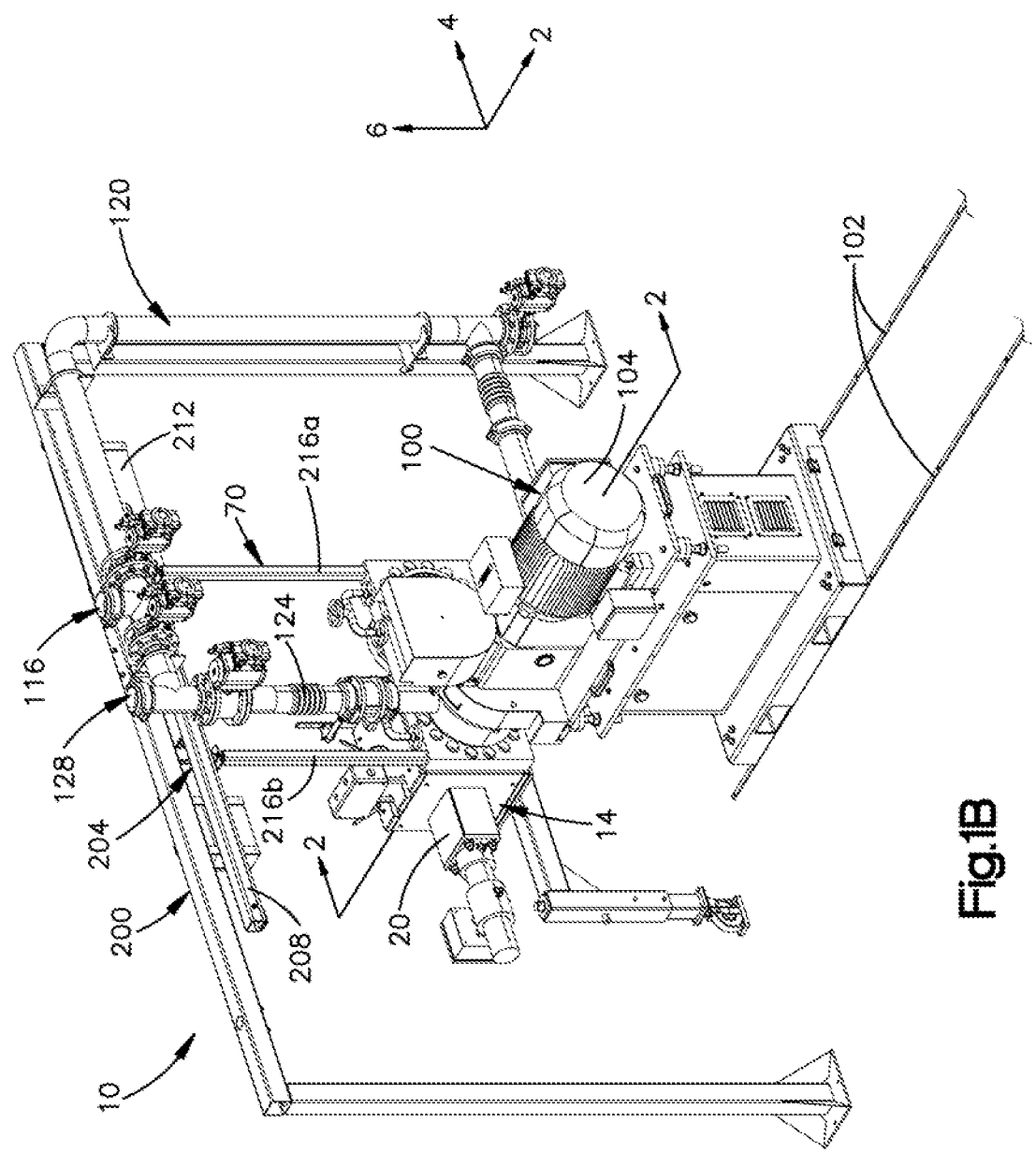
FIG. 1B is an alternative perspective view of the pelletizing system shown in FIG. 1A.
Figure 2:
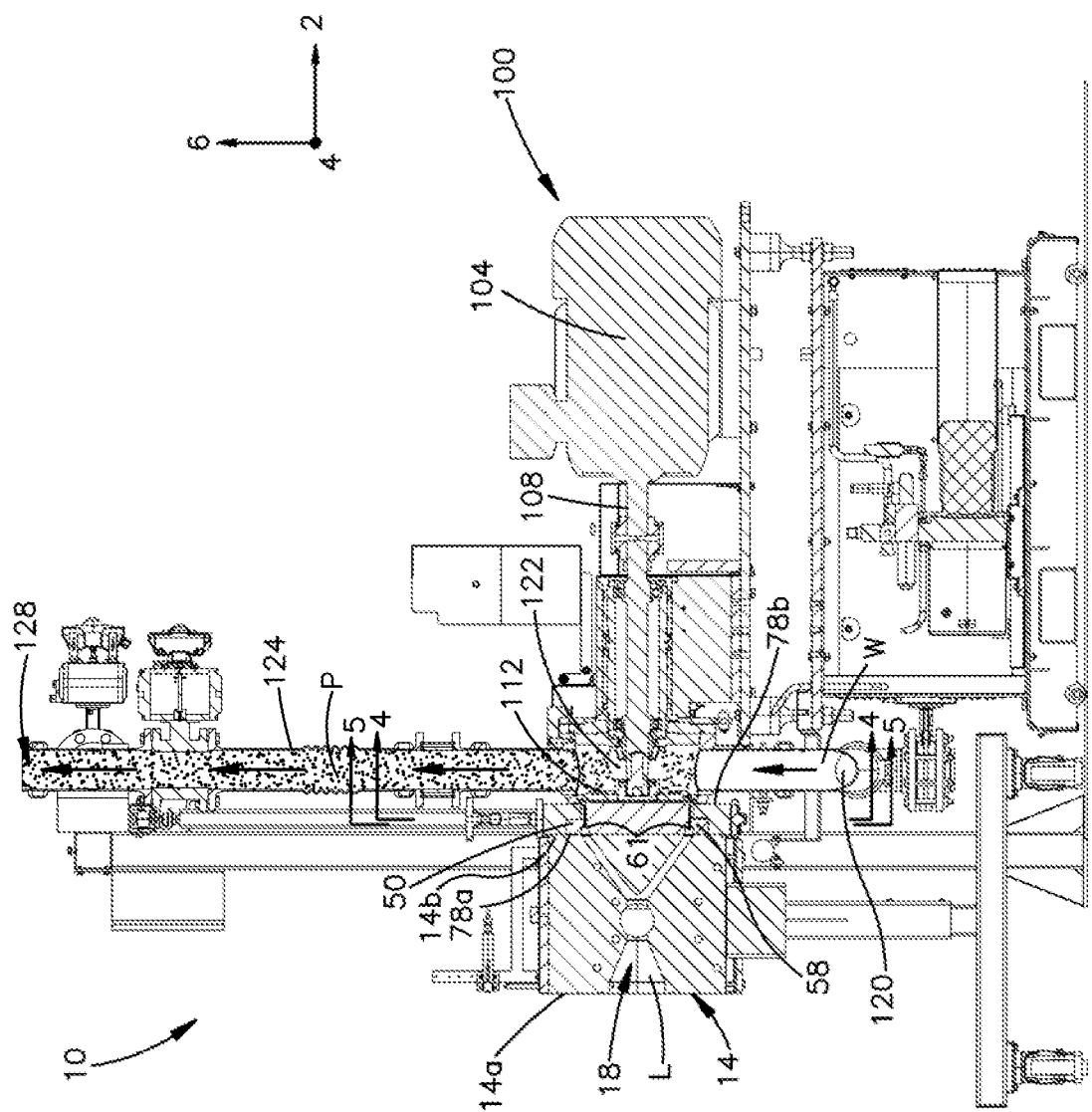
FIG. 2 is a cross-sectional view of the pelletizing system shown in FIG. 1A, taken along line 2-2 in FIG. 1B.

Described herein is a pelletizing system 10 configured to create pellets P from a flow of liquid material L. The pelletizing system 10 includes a die plate changing system 70, 370 configured to hold and heat first and second die plates 25, 50, 325, 350. Certain terminology is used to describe the pelletizing system 10 in the following description for convenience only and is not limiting. The words "right", "left", "lower," and "upper" designate directions in the drawings to which reference is made. The words "inner" and "outer" refer to directions toward and away from, respectively, the geometric center of the description to describe the pelletizing system 10 and related parts thereof. The terminology includes the above-listed words, derivatives thereof and words of similar import.

Unless otherwise specified herein, the terms "longitudinal," "lateral," and "vertical" are used to describe the orthogonal directional components of various components of the pelletizing system 10 as designated by the longitudinal direction 2, lateral direction 4, and vertical direction 6. It should be appreciated that while the longitudinal and lateral directions 2, 4 are illustrated as extending along a horizontal plane, and the vertical direction 6 is illustrated as extending along a vertical plane, the planes that encompass the various directions may differ during use.

Referring to FIGS. 1A-3, a pelletizing system 10 according to an embodiment of the present disclosure is depicted. The pelletizing system 10 can include a material source in fluid communication with an extruder (not shown), where the material source is configured to receive a flow of the liquid material L from the extruder. In one example, the material source can be a diverter valve 14, although examples of the disclosure are not so limited. The diverter valve 14 can define a body that extends from a first end 14a to a second end opposite the first end 14a along the longitudinal direction 2, as well as a passage 18 that extends through the diverter valve 14 from the first end 14a to the second end 14b. The passage 18 can be configured to receive the flow of liquid material L from the extruder at the first end 14a, such that the flow of liquid material L flows through the passage 18 of the diverter valve 14 along the longitudinal direction 2. A bypass valve piston 20 can be attached to the diverter valve 14 and in fluid communication with the passage 18. The bypass valve piston 20 can be configured to selectively divert the flow of liquid material L from the passage 18, such as to a trolley for recycling or disposal of the liquid material L. This diversion can occur during breaks in a pelletizing operation or when a component of the pelletizing system 10 is being serviced or replaced.

A second die plate 50 can be positioned adjacent the second end 14b of the diverter valve 14, such that the second die plate 50 is configured to receive the flow of liquid material L exiting the passage 18 of the diverter valve 14. The second die plate 50 can be supported by the frame 75 of a die plate changing system 70, where first and second die plates 25, 50 and the die plate changing system 70 will be discussed further below. The second die plate 50 can have a body 58 defining a plurality of passages 61 extending therethrough. Each of the passages 61 can define a diameter that correlates to the diameter of the pellets P produced by the pelletizing system 10. In relation to other features of the pelletizing system 10, the diameter of each of the passage 61 can be substantially smaller than that of the passage 18 of the diverter valve 14. The flow of liquid material L can be pressurized to an extent that it is forced through the passage 61 of the second die plate 50, producing elongated rods of the liquid material L. The liquid material L is then forced into an output line 124, as will be described further below.

The pelletizing system 10 can further include a pelletizer 100. The pelletizer 100 can be positioned on tracks 102, such that the pelletizer 100 can be moved away from other components of the pelletizing system 10, such as the die plate changing system 70, during certain maintenance procedures, such as a die plate changing operation. The pelletizer 100 can comprise a motor 104, as well as a shaft 108 extending from the motor 104 to a cutting head 112. The cutting head 112 can be positioned within a cutting chamber 122 adjacent the second die plate 50, specifically at a side of the second die plate 50 opposite the diverter valve 14. In operation, the motor 104 of the pelletizer 100 can be configured to rotate the cutting head 112 via the shaft 108. The cutting head 112 can include a plurality of blades, such that the cutting head 112 is configured to cut the elongated rods of liquid material L exiting the second die plate 50 into discrete pellets P of a particular length. The length of the pellets P created by the cutting head 112 can be increased or decreased by adjusting the rotational speed of the cutting head 112.

Continuing with FIGS. 1A-3, the pelletizing system 10 can include an input line 120 defining a water input 116. The input line 120 can be configured to receive water W through the water input 116 from a water source (not shown), where the water source can be configured to provide room temperature or cooler water W to the pelleting system 10. The input line 120 is configured to direct the water W through the pelletizing system 10 to a cutting chamber 122. The cutting chamber 122 can be configured to receive the cutting head 112 and can be positioned adjacent the end of the second die plate 50 opposite the diverter valve 14. The cutting chamber 122 can be configured to receive both the flow of water W from the input line 120 and the pellets P cut by the cutting head 112. When the pellets P are placed into contact with the water W, the water W serves multiple purposes. First, as the water W can have a significantly lower temperature than the pellets P immediately after they exit the second die plate 50 and are cut by the cutting head 112, the water W can cool the pellets P such that the pellets P maintain their as-cut size and shape. Second, the flow of water W can carry the pellets P away from the cutting head 112 through the pelletizing system 10. Specifically, the flow of water W and pellets P can flow upwards along vertical direction 6 from the cutting chamber 122 and into an output line 124. The output line 124 can extend from the cutting chamber 122 to a slurry output 128. From the slurry output 128, the mixture of pellets P and water W can flow to a pellet dryer (not shown), which can function to separate the water W from the pellets P, providing the operator of the pelletizing system 10 with a supply of substantially dry pellets P.

Now referring to FIGS. 3-5, the die plate changing system 70 and the first and second die plates 25, 50 will be described in greater detail. The first die plate 25 can comprise a body 28, as well as a plurality of passages 31 extending through the body 28 along the longitudinal direction 2. In the depicted embodiment, the passages 31 are positioned in a substantially ring-like arrangement, though in other embodiments it is contemplated that the passages 31 can be alternatively situated. The passages 31 can define substantially cylindrical, elongate bores that can be designed so as to correspond in diameter to the intended diameter of the pellets P produced by the pelletizing system 10. As a result, the passages 31 can have alternative sizes and/or shapes so as to produce pellets P having other sizes. Further, though the first die plate 25 is shown as defining a particular number of passages 31, the first die plate 25 can define any number of passages in other embodiments.

The first die plate 25 can further define a plurality of bores 34 extending through the upper end of the body 28 of the first die plate 25 along the longitudinal direction 2. Each of the bores 34 can be positioned along the periphery of the first die plate 25, though other positions for the bores 34 are contemplated. The bores 34 can be configured to each receive a fastener 35 so as to secure the first die plate 25 to the frame 75 of the die plate changing system 70, where the frame 75 will be described further below. The fasteners 35 can be bolts, screws, pins, or any conventional fastener capable of extending through respective bores 34 so as to releasably couple the first die plate 25 to the frame 75. The first die plate 25 can define an input passage 43 positioned at the lower end of the body 28. The input passage 43 can extend from the channel 40 to an outer surface of the first die plate 25. The input passage 43 can be configured to receive the heated liquid from the frame 75 and provide the heated liquid to the channel 40. Though shown as positioned at the lower end of the body 28, the input passage 43 can be otherwise positioned on the first die plate 25 as desired. The channel 40 can be configured to receive the heated liquid from the input passage 43 and distribute the heated liquid throughout the first die plate 25 so as to evenly heat the first die plate 25. In a pelletizing operation, it is important to heat the first and second die plates 25, 50 so as to maintain the flow of liquid material L in a substantially liquid state as it is being forced through one of the first and second die plates 25, 50. Undue cooling of the liquid material L within the first and second die plates 25, 50 can lead to clogging of the passages 31, 61, thus disrupting the entire operation of the pelletizing system 10.

In the depicted embodiment, the channel 40 is shown as having a substantially ring-like shape that extends radially around the entirety of the passages 31. However, the channel 40 can be otherwise configured so as to heat the first die plate 25. For example, it is contemplated that the channel 40 can define any combination of additional passages or channels or define various other shapes. The first die plate 25 can further define a first output passage 37a extending from the outer surface of the first die plate 25, as well as a second output passage 37b spaced from the first output passage 37a that also extends from the outer surface of the first die plate 25. Though depicted as positioned at the upper end of the first die plate 25, the first and second output passages 37a, 37b can be otherwise located on the first die plate 25 as desired. Each of the first and second output passages 37a, 37b can be configured to receive the heated liquid from the channel 40 and direct the heated liquid to the frame 75. The first and second output passages 37a, 37b can extend from the outer surface of the first die plate 25 to the channel 40. Further, though the first die plate 25 is shown as defining two output passages 37a, 37b and one input passage 43, the first die plate 25 can define more or less input and output passages in other embodiments.

Figure 3:
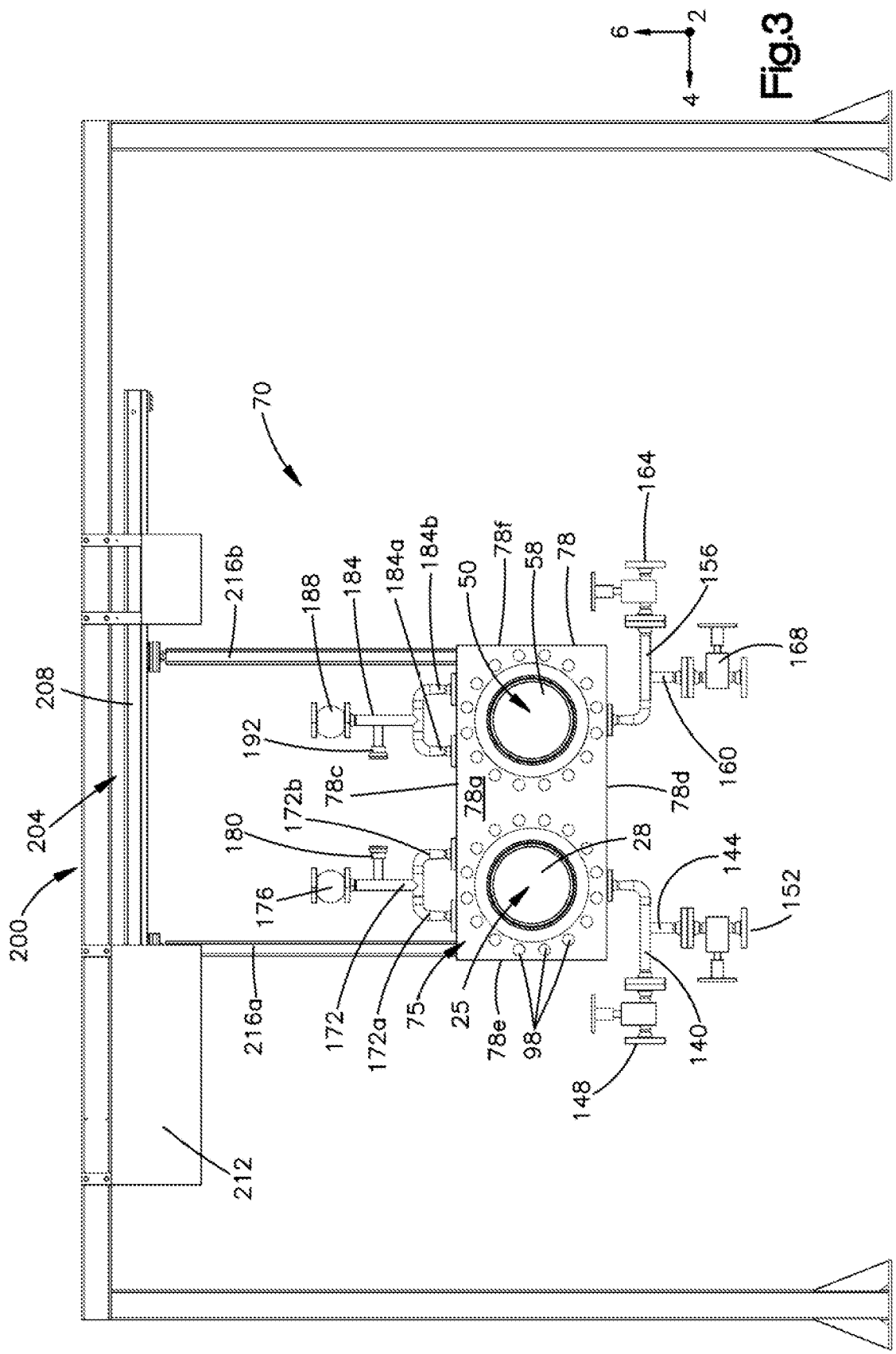
FIG. 3 is a front view of the die plate changing system of the pelletizing system shown in FIG. 1A.
Figure 4:
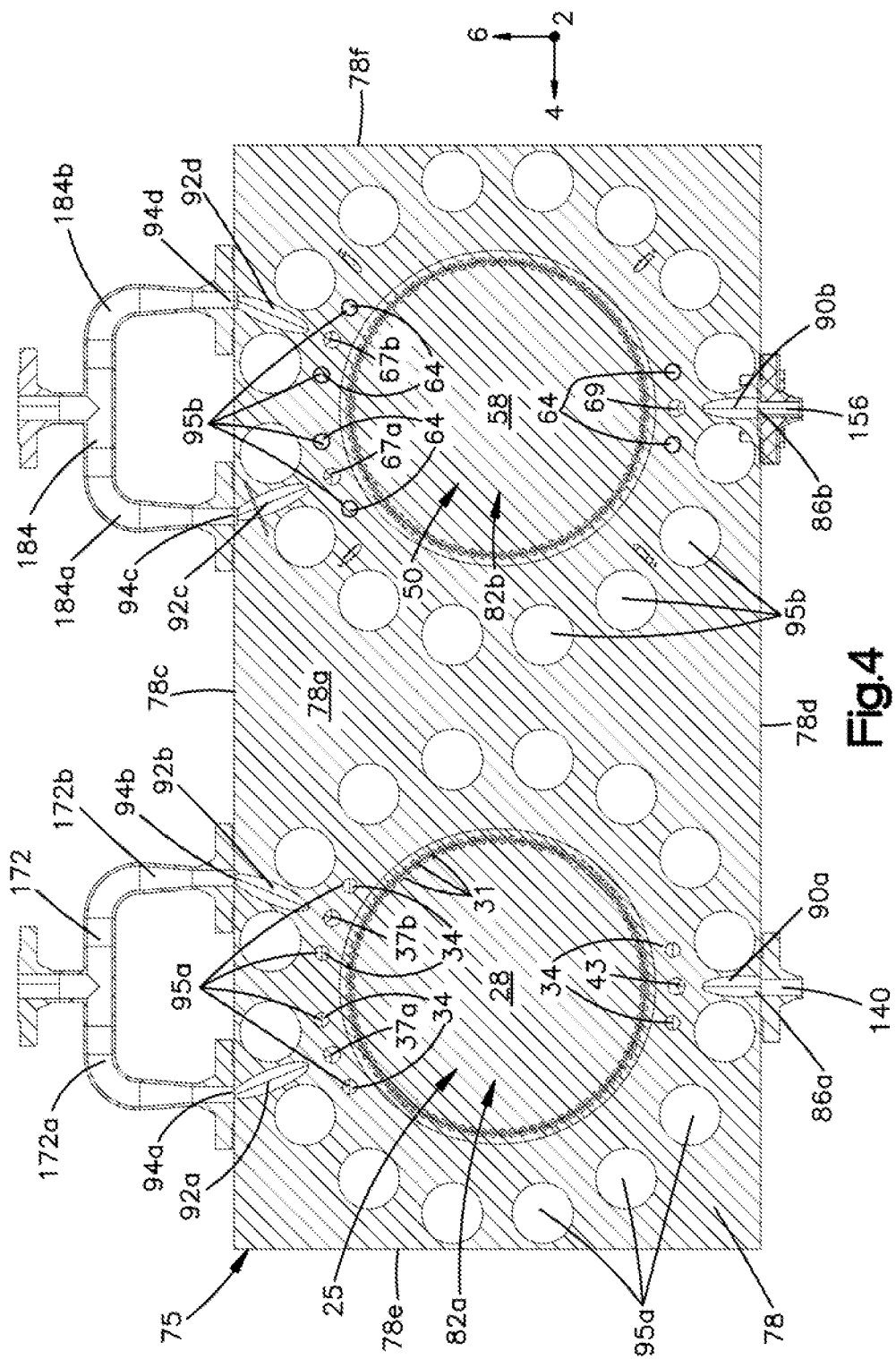
FIG. 4 is a cross-sectional view of a portion of the die plate changing system shown in FIG. 3, taken along line 4-4 shown in FIG. 2.
Figure 5:
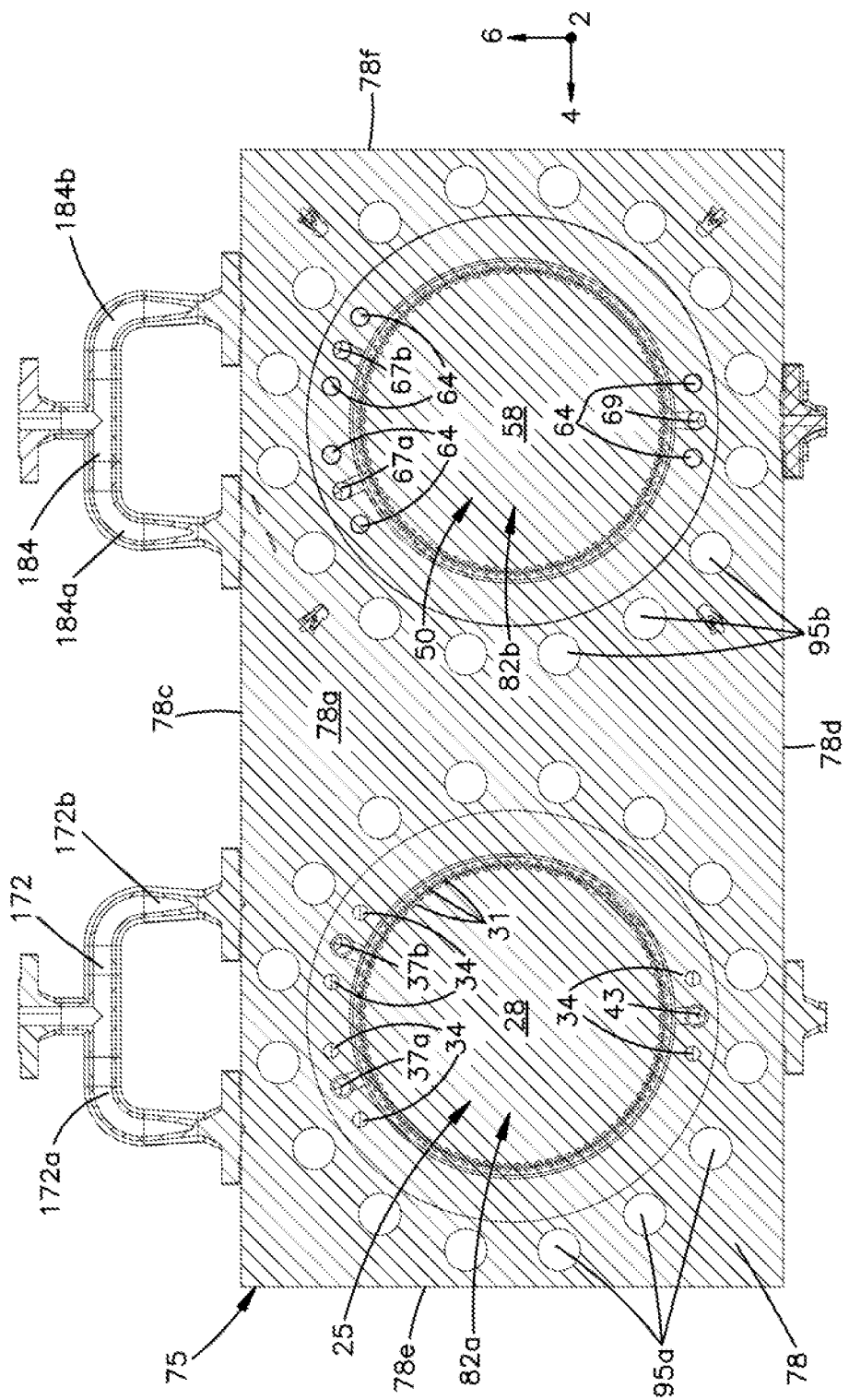
FIG. 5 is a cross-sectional view of a portion of the die plate changing system shown in FIG. 3, taken along line 5-5 shown in FIG. 2.
Figure 6B:
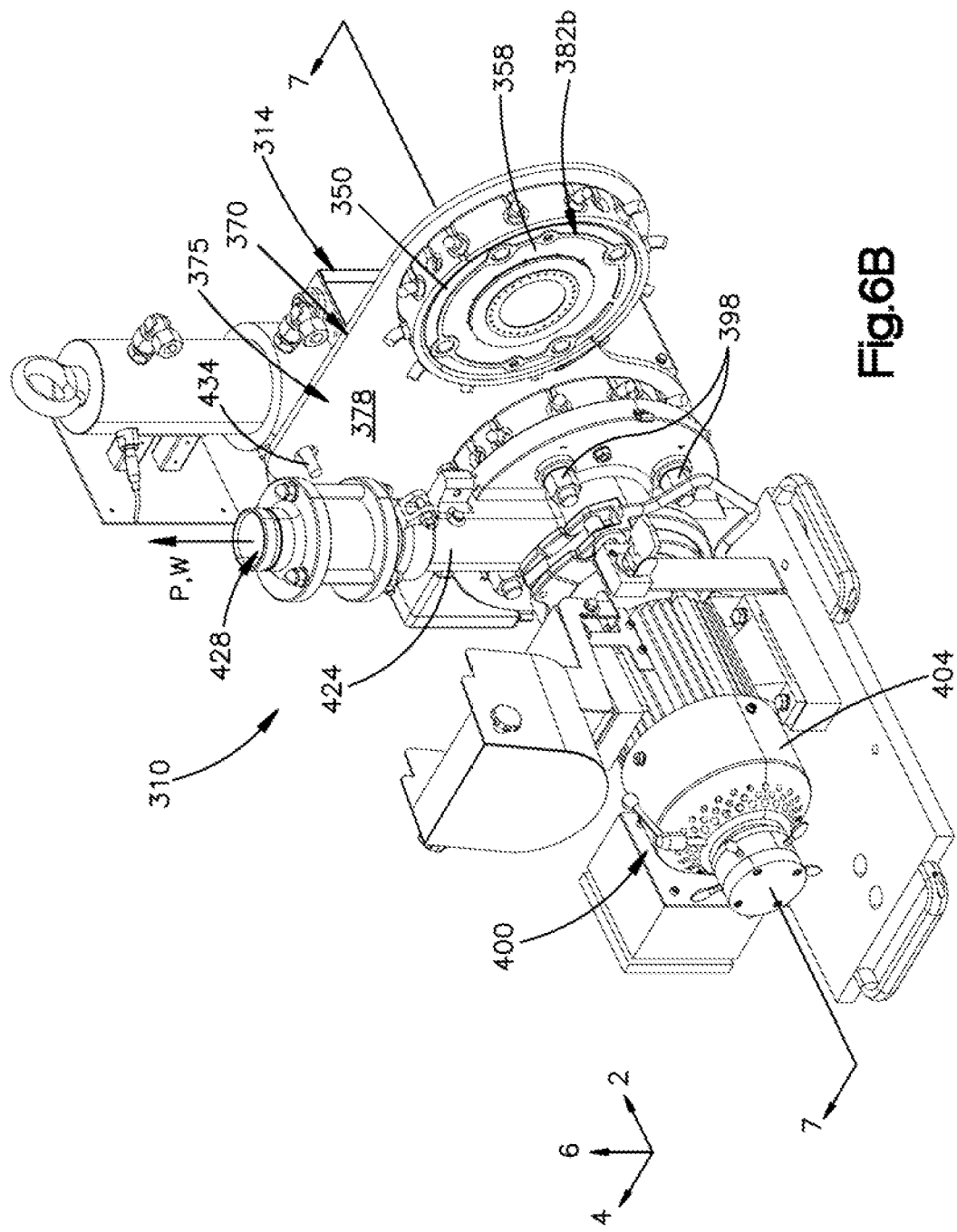
FIG. 6B is an alternative perspective view of the pelletizing system shown in FIG. 6A.
Figure 7:
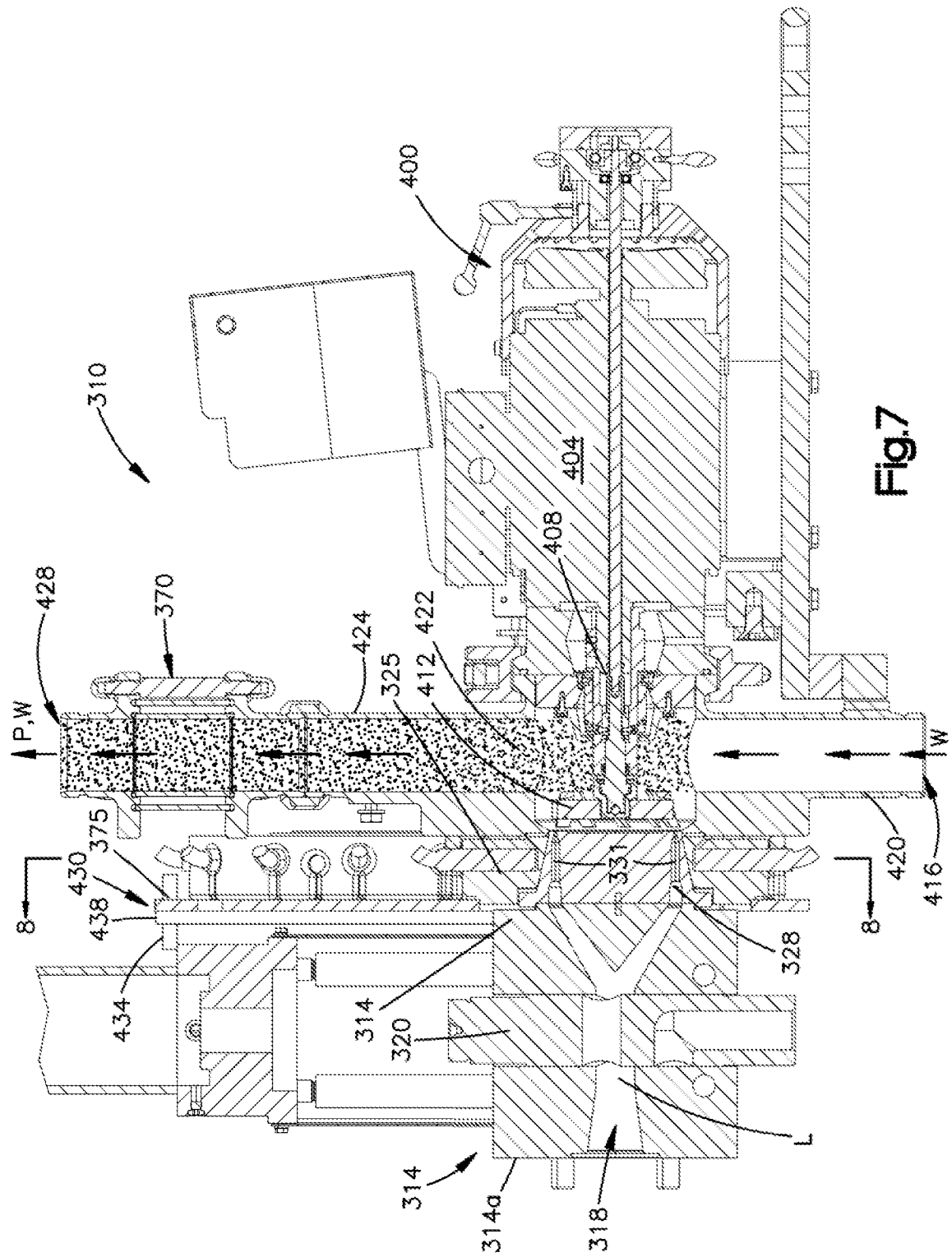
FIG. 7 is a cross-sectional view of the pelletizing system shown in FIG. 6A, taken along line 7-7 shown in FIG. 6B.
Figure 8:
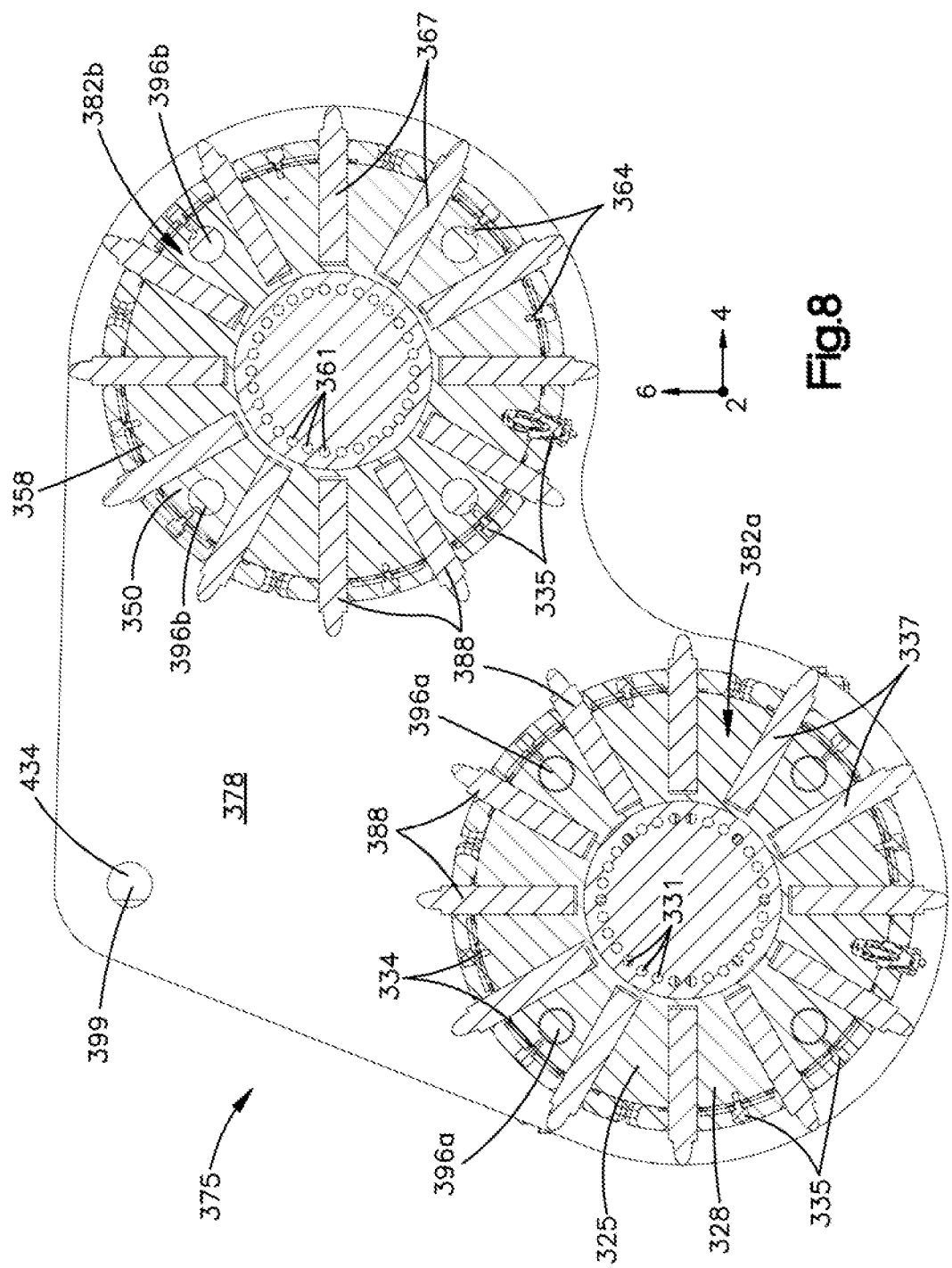
FIG. 8 is a cross-sectional view of the die plate changing system of the pelletizing system shown in FIG. 6A, taken along line 8-8 shown in FIG. 7.

Continuing with FIGS. 3-5, the pelletizing system 10 can include a second die plate 50. The second die plate 50 can comprise a body 58, as well as a plurality of passages 61 extending through the body 58 along the longitudinal direction 2. In the depicted embodiment, the passages 61 are positioned in a substantially ring-like arrangement, though in other embodiments it is contemplated that the passages 61 can be alternatively situated. The passages 61 can define substantially cylindrical, elongate bores that can be designed so as to correspond in diameter to the intended diameter of the pellets P produced by the pelletizing system 10. As a result, the passages 61 can have alternative sizes and/or shapes so as to produce pellets P having other sizes. Further, though the second die plate 50 is shown as defining a particular number of passages 61, the second die plate 50 can define any number of passages in other embodiments. In the depicted embodiment, the passages 31, 61 of the first and second die plates 25, 50 are depicted as having substantially identical designs and arrangements. However, it is contemplated that the first and second die plates 25, 50 can have differently sized and/or arranged passages 31, 61, such as when the die plate changing system 70 is being utilized to alternate between two different pelletizing operations.

The second die plate 50 can further define a plurality of bores 64 extending through the upper end of the body 58 of the second die plate 50 along the longitudinal direction 2. Each of the bores 64 can be positioned along the periphery of the second die plate 50, though other positions for the bores 64 are contemplated. The bores 64 can be configured to each receive a fastener, such as fastener 35 described above, so as to secure the second die plate 50 to the frame 75 of the die plate changing system 70. The second die plate 50 can further define an input passage 69 positioned at the lower end of the body 58. The input passage 69 can extend from the channel 68 to an outer surface of the second die plate 50. The input passage 69 can be configured to receive the heated liquid from the frame 75 and provide the heated liquid to the channel 68. Though shown as positioned at the lower end of the body 58, the input passage 69 can be otherwise positioned on the second die plate 50 as desired. The channel 68 can be configured to receive the heated liquid from the input passage 69 and distribute the heated liquid throughout the second die plate 50 so as to evenly heat the second die plate 50.

In the depicted embodiment, the channel 68 is shown as having a substantially ring-like shape that extends radially around the entirety of the passages 61. However, the channel 68 can be otherwise configured so as to heat the second die plate 50. For example, it is contemplated that the channel 68 can define any combination of additional passages or channels or define various other shapes. The second die plate 50 can also define a first output passage 67a extending from the outer surface of the second die plate 50, as well as a second output passage 67b spaced from the first output passage 67a that also extends from the outer surface of the second die plate 50. Though depicted as positioned at the upper end of the second die plate 50, the first and second output passages 67a, 67b can be otherwise located on the second die plate 50 as desired. Each of the first and second output passages 67a, 67b can be configured to receive the heated liquid from the channel 68 and provide the heated liquid to the frame 75. The first and second output passages 67a, 67b can extend from the outer surface of the second die plate 50 to the channel 68 that extends through the second die plate 50. Further, though the second die plate 50 is shown as defining two output passages 67a, 67b and one input passage 69, the second die plate 50 can define more or less input and output passages in other embodiments.

Continuing with FIGS. 3-5, the die plate changing system 70 will be described in greater detail. The die plate changing system 70 can be configured to hold the first and second die plates 25, 50 and selectively transition the first and second die plates 25, 50 into and out of communication with the diverter valve 14. The die plate changing system 70 can include a frame 75, where the frame 75 has a body 78. The body 78 can define a front surface 78a, as well as a rear surface 78b opposite the front surface 78a along the longitudinal direction 2. The body 78 can also define a top surface 78c, and a bottom surface 78d opposite the top surface 78c along the vertical direction 6. Further, the body 78 can define a first side surface 78e and a second side surface 78f opposite the first side surface 78e along the lateral direction 4. As such, the body 78 of the frame 75 can be substantially shaped as a rectangular prism. However other shapes and designs for the frame 75 are contemplated. Within the pelletizing system 10, the front surface 78a of the frame 75 can be adjacent the diverter valve 14, and the rear surface 78b can be adjacent the cutting head 112 of the pelletizer 100.

The frame 75 can define a first recess 82a extending into the body 78 from the front surface 78a, as well as a second recess 82b extending into the body 78 from the front surface 78a. The first recess 82a is configured to receive the first die plate 25, and the second recess 82b is configured to receive the second die plate 50. Portions of the first and second recesses 82a, 82b can extend completely through the body 78 from the front surface 78a to the rear surface 78b, such that the flow of liquid material L can flow through the passages 31, 61 of one of the first and second die plates 25, 50 when the first and second die plates 25, 50 are disposed within the first and second recesses 82a, 82b. The frame 75 can include a plurality of bores 95a that are configured to align with the bores 34 of the first die plate 25 when the first die plate 25 is received within the first recess 82a, and receive fasteners 35 therethrough so as to secure the first die plate 25 to the frame 75. The frame 75 can also include a plurality of bores 95b that are configured to align with the bores 64 of the second die plate 50 when the second die plate 50 is received within the second recess 82b, and receive fasteners 35 therethrough so as to secure the second die plate 25 to the frame 75. The number, alignment, and shape of the bores 95a, 95b will generally correspond to that of the bores 34, 64 with which they are configured to align, as well as the fasteners 35 that they are configured to receive. However, like the bores 34, 64, the bores 95a, 95b can be shaped and/or positioned differently than depicted in other embodiments.

The frame 75 can be configured to couple to the diverter valve 14 during a pelletizing operation. Specifically, the frame 75 can include a plurality of bores 95a positioned radially around the first recess 82a, where the bores 95a are each configured to receive a respective fastener 98 so as to couple the frame 75 to the diverter valve 14 when the first die plate 25 is in fluid communication with the diverter valve 14 and the pelletizer 100. The frame 75 can also include a plurality of bores 95b positioned radially around the second recess 82b, where the bores 95b are each configured to receive a respective fastener 98 so as to couple the frame 75 to the diverter valve 14 when the second die plate 50 is in fluid communication with the diverter valve 14 and the pelletizer 100. Though a particular number and arrangement of bores 95a, 95b is shown, more or less bores 95a, 95b can be included in the frame 75, as well as bores 95a, 95b having different designs. It is contemplated that the fasteners 98 could be bolts, or any other type of conventional fastener capable of releasably coupling the frame 75 to the diverter valve 14.

In operation, only one of the first and second die plates 25, 50 is in fluid communication with the diverter valve 14 and the pelletizer 100. In previous pelletizing systems, the system would have to be disassembled in order to service and/or replace a die plate. In the pelletizing system 10, the die plate changing system 70 can easily transition between positioning the first die plate 25 and the second die plate 50 in fluid communication with other aspects of the pelletizing system 10. To do this, the die plate changing system 70 can include a movement assembly 204 operably coupled to the frame 75 and configured to selectively move the frame 75 between multiple positions. For example, the movement assembly 204 can be configured to move the frame 75 between a first position, where the first die plate 25 is configured to receive the liquid material from the diverter valve 14, and a second position, where the second die plate 50 is configured to receive the material from the diverter valve 14. The second position is explicitly shown in FIGS. 1A-2.

In the embodiment shown in FIGS. 1-5, the movement assembly 204 is configured to move the frame 75 linearly along the lateral direction 4 between the first and second positions. To do this, the movement assembly 204 can comprise a linear track 208. The die plate changing system 70 can further include a support structure 200, where the linear track 208 is coupled to the support structure 200. The support structure 200 depicted can have an arch-shaped body comprising metal beams, though other shapes for the support structure 200 are contemplated. The pelletizing system 10 can further include first and second supports 216a, 216b, where each of the first and second supports 216a, 216b are configured to extend from the frame 75 to the linear track 208 so as to couple the frame 75 to the linear track 208. Specifically, the frame 75 can hang from the linear track 208 via the first and second supports 216a, 216b. As such, the frame 75 is configured to selectively move along the linear track 208 between the first and second positions. To move the frame 75, the die plate changing system 70 can include a motor 212 operatively coupled to the frame 75. Specifically, the motor 212 can be coupled to the support structure 200, the linear track 208, and/or the first and second supports 216a, 216b. The motor 212 can be configured to automatically move the frame 75 along the linear track 208 between the first and second directions, either upon commands received by a controller or upon direction by the operator of the pelletizing system 10. Alternatively, the frame 75 can be manually transitioned between the first and second positions by the operator. To do this, the operator can manually apply a lateral force to the frame 75 and/or the first and second supports 216a, 216b so as to move the frame 75 along the linear track 208 into the desired first or second position.

In addition to moving between first and second positions so as to selectively place one of the first and second die plates 25, 50 in fluid communication with the diverter valve 14 and the pelletizer 100, the die plate changing system 70 can further be configured to heat the first and second die plates 25, 50. In other words, the die plate changing system 70 can heat both the one of the first and second die plates 25, 50 that is in fluid communication with the diverter valve 14 and the pelletizer 100, as well as the other one of the first and second die plates 25, 50 that is not in fluid communication with the diverter valve 14 or the pelletizer 100. In pelletizing systems, die plates must be heated before use so that the liquid material forced therethrough stays heated and maintains optimal flow characteristics. As a result, when a die plate must be replaced, additional downtime is conventionally needed to allow the newly installed die plate to sufficiently increase in temperature until a pelletizing operation can be performed. This additional downtime further increases the costs associated with performing a die plate changing operation.

In contrast, the die plate changing system 70, and particularly the frame 75, is configured to heat both the first and second die plates 25, 50 when the first and second die plates 25, 50 are disposed in the first and second recesses 82a, 82b, respectively. As a result, the one of the die plates 25, 50 that is to replace the other die plate 25, 50 that is in fluid communication with the diverter valve 14 and pelletizer 100 can be brought up to temperature prior to installation, thus eliminating a previously-required time-consuming step in die plate replacement. To perform this function, the die plate changing system 70 can include a plurality of passages and valves for controlling a flow of heated liquid through the die plate changing system 70. The heated liquid can be a heated oil or heated water, though other liquids are contemplated.

To supply the first die plate 25 with heated liquid, the die plate changing system 70 can include a first input passage 140 that extends from a first input valve 148 to a first input 86a defined by the frame 75. The first input passage 140 can be configured to receive the heated liquid from a heated liquid source (not shown) and direct the heated liquid to the first input 86*a* of the plate. As the first input valve 148 is in fluid communication with the first input 86*a*, the first input valve 148 can be configured to control the flow of heated liquid into the first input passage 140 and the first input 86*a*. For example, the first input valve 148 can be configured to allow the heated liquid to flow to the first input 86*a* during a die plate heating operation, as well as selectively prevent the heated liquid from flowing to the first input 86*a* during a liquid drainage operation, which will be described further below.

As stated above, the frame 75 can include a first input 86*a* configured to receive the heated liquid from the first input passage 140. The frame 75 can further include a first input passage 90*a* that extends from the first input 86*a* to the first recess 82*a*. When the first input valve 148 is open, the first input passage 90*a* is configured to receive the heated liquid from the first input 86*a* and supply the first die plate 25 with the heated liquid. Specifically, the first input passage 90*a* can be in fluid communication with the input passage 43 of the first die plate 25, where the input passage 43 directs the heated liquid into the channel 40 of the first die plate 25, and then to the first and second output passage 37*a*, 37*b* of the first die plate 25. The frame can also define first and second output passages 92*a*, 92*b*, where each of the first and second output passages 92*a*, 92*b* extends from the first recess 82*a* to a first and second outputs 94*a*, 94*b*, respectively. The first and second output passages 92*a*, 92*b* can be configured to receive the heated liquid from the first die plate 25, specifically the first and second output passages 37*a*, 37*b* of the first die plate 25, and direct the heated liquid to the first and second outputs 94*a*, 94*b*, respectively. The die plate changing system 70 can further include a first output passage 172 that extends from the first and second outputs 94*a*, 94*b* to a first output valve 176. Specifically, the first output passage 172 can include a first branch 172*a* that extends from the first output 94*a* and a second branch 172*b* that extends from the second output 94*b*. As the first output valve 176 is in fluid communication with the first and second outputs 94*a*, 94*b*, the first output valve 176 can be configured to selectively control the flow of heated liquid from the frame 75, through the first output valve 176, and back to the heated liquid supply or a used heated liquid collection area (not shown). For example, the first output valve 176 can be configured to allow the heated liquid to flow through the first output valve 176 during a die plate heating operation, as well as selectively prevent the heated liquid from flowing through the first output valve 176 during a liquid drainage operation, which will be described further below.

The die plate changing system 70 can include additional components that can be utilized in a drainage operation of the first die plate 25. This can be performed when the first die plate 25 is no longer in operation, and the operator of the pelletizing system 10 needs to remove the first die plate 25 from the frame 75, such as to install a new die plate or perform maintenance on the first die plate 25. The die plate changing system 70 can include a first drainage passage 144 that extends from the first input passage 140 to a first drainage valve 152, as well as a first ventilation passage 180 that extends from the first output passage 172. When the first input valve 148 and the first output valve 176 are closed, and the first drainage valve 152 is open, the heated liquid can flow from within the frame 75 and the first die plate 25, through the first drainage passage 144, and out of the die plate changing system 70. The first ventilation passage 180 can allow air to flow through the frame 75 and the first die plate 25 to replace the heated liquid exiting the frame 75 and first die plate 25 through the first drainage passage 144.

Continuing with FIGS. 3-5, to supply the second die plate 50 with heated liquid, the die plate changing system 70 can include a second input passage 156 that extends from a second input valve 164 to a second input 86*b* defined by the frame 75. The second input passage 156 can be configured to receive the heated liquid from a heated liquid source (not shown) and direct the heated liquid to the second input 86*b* of the frame 75. As the second input valve 164 is in fluid communication with the second input 86*b*, the second input valve 164 can be configured to control the flow of heated liquid into the second input passage 156 and the second input 86*b*. For example, the second input valve 164 can be configured to allow the heated liquid to flow to the second input 86*b* during a die plate heating operation, as well as selectively prevent the heated liquid from flowing to the second input 86*b* during a liquid drainage operation, which will be described further below.

As stated above, the frame 75 can include a second input 86*b* configured to receive the heated liquid from the second input passage 156. The frame 75 can further include a second input passage 90*b* that extends from the second input 86*b* to the second recess 82*b*. When the second input valve 164 is open, the second input passage 90*b* is configured to receive the heated liquid from the second input 86*b* and supply the second die plate 50 with the heated liquid. Specifically, the second input passage 90*b* can be in fluid communication with the input passage 69 of the second die plate 50, where the input passage 69 directs the heated liquid into the channel 68 of the second die plate 50, and then to the first and second output passage 67*a*, 67*b* of the second die plate 50. The frame 75 can also define third and fourth output passages 92*c*, 92*d*, where each of the third and fourth output passages 92*c*, 92*d* extends from the second recess 82*b* to a third and fourth output 94*c*, 94*d*, respectively. The third and fourth output passages 92*c*, 92*d* can be configured to receive the heated liquid from the second die plate 50, specifically the first and second output passages 67*a*, 67*b* of the second die plate 50, and direct the heated liquid to the third and fourth outputs 94*c*, 94*d*, respectively. The die plate changing system 70 can further include a second output passage 184 that extends from the third and fourth outputs 94*c*, 94*d* to a second output valve 188. Specifically, the second output passage 184 can include a first branch 184*a* that extends from the third output 94*c* and a second branch 184*b* that extends from the fourth output 94*d*. As the second output valve 188 is in fluid communication with the third and fourth outputs 94*c*, 94*d*, the second output valve 188 can be configured to selectively control the flow of heated liquid from the frame 75, through the second output valve 188, and back to the heated liquid supply or a used heated liquid collection area (not shown). For example, the second output valve 188 can be configured to allow the heated liquid to flowing through the second output valve 188 during a die plate heating operation, as well as selectively prevent the heated liquid from flowing through the second output valve 188 during a liquid drainage operation, which will be described further below.

The die plate changing system 70 can include additional components that can be utilized in a drainage operation of the second die plate 50. This can be performed when the second die plate 50 is no longer in operation, and the operator of the pelletizing system 10 needs to remove the second die plate 50 from the frame 75, such as to install a new die plate or perform maintenance on the second die plate 50. The die plate changing system 70 can include a second drainage passage 160 that extends from the second input passage 156 to a second drainage valve 168, as well as a second ventilation passage 192 that extends from the second output passage 184. When the second input valve 164 and the second output valve 188 are closed, and the second drainage valve 168 is open, the heated liquid can flow from within the frame 75 and the second die plate 50, through the second drainage passage 160, and out of the die plate changing system 70. The second ventilation passage 192 can allow air to flow through the frame 75 and the second die plate 50 to replace the heated liquid exiting the frame 75 and second die plate 50 through the second drainage passage 160.

As described above, the die plate changing system 70 can include two fluidly isolated systems of passages for heating the first and second die plates 25, 50, as well as the frame 75, using a heated liquid. This allows each of the first and second die plates 25, 50 to be heated or drained of heated liquid and removed from the frame 75 independent from each other, thus allowing die plates to be used in future operations to be installed in advance and brought up to temperature before the die plate currently in fluid communication with the diverter valve 14 and the pelletizer 100 is to be removed from operation. As a result, the time required to perform a die plate changing operation is significantly reduced, which likewise reduces associated pelletizing operation costs.

Now referring to FIGS. 6A-8, another embodiment of a pelletizing system 310 will be described. The pelletizing system 310 can include a diverter valve 314 in fluid communication with an extruder (not shown), where the diverter valve 314 is configured to receive a flow of the liquid material L from the extruder. The diverter valve 314 can define a body that extends from a first end 314a to a second end opposite the first end 314a along the longitudinal direction 2, as well as a passage 318 that extends through the diverter valve 314 from the first end 314a to the second end 314b. The passage 318 can be configured to receive the flow of liquid material L from the extruder at the first end 314a, such that the flow of liquid material L flows through the passage 318 of the diverter valve 314 along the longitudinal direction 2. A bypass valve 320 can be attached to the diverter valve 314 and in fluid communication with the passage 318. The bypass valve 320 can be configured to selectively divert the flow of liquid material L from the passage 318 to device for disposal or recycling, such as during breaks in a pelletizing operation or when a component of the pelletizing system 310 is being serviced or replaced.

A first die plate 325 can be positioned adjacent the second end 314b of the diverter valve 314, such that the first die plate 325 is configured to receive the flow of liquid material L exiting the passage 318 of the diverter valve 314. The first die plate 325 can be supported by the frame 375 of a die plate changing system 370, where first and second die plates 325, 350 and the die plate changing system 370 will be discussed further below. The first die plate 325 can have a body 328 defining a plurality of passages 331 extending therethrough. Each of the passages 331 can define a diameter that correlates to the diameter of the pellets P produced by the pelletizing system 310. In relation to other features of the pelletizing system 310, the diameter of each of the passages 331 can be substantially smaller than that of the passage 318 of the diverter valve 314. The flow of liquid material L can be pressurized to an extent that it is forced through the passages 331 of the first die plate 325, producing elongated rods of the liquid material L. The liquid material L is then forced into an output line 424, as will be described further below.

The pelletizing system 310 can further include a pelletizer 400. The pelletizer 400 can comprise a motor 404, as well as a shaft 408 extending from the motor 404 to a cutting head 412. The cutting head 412 can be positioned within a cutting chamber 422 adjacent the first die plate 325, at a side of the first die plate 325 opposite the diverter valve 314. In operation, the motor 404 of the pelletizer 400 can be configured to rotate the cutting head 412 via the shaft 408. The cutting head 412 can include a plurality of blades, such that the cutting head 412 is configured to cut the elongated rods of liquid material L exiting the first die plate 325 into discrete pellets P of a particular length. The length of the pellets P created by the cutting head 412 can be increased or decreased by adjusting the rotational speed of the cutting head 412.

Continuing with FIGS. 6A-8, the pelletizing system 310 can include an input line 420 defining a water input 416. The input line 420 can be configured to receive water W through the water input 416 from a water source (not shown), where the water source can be configured to provide room temperature or cooler water W to the pelleting system 310. The input line 420 is configured to direct the water W through the pelletizing system 310 to a cutting chamber 422. The cutting chamber 422 can be configured to receive the cutting head 412 and can be positioned adjacent the end of the first die plate 325 opposite the diverter valve 314. The cutting chamber 422 can be configured to receive both the flow of water W from the input line 420 and the pellets P cut by the cutting head 412. When the pellets P are placed into contact with the water W, the water W serves multiple purposes. First, as the water W can have a significantly lower temperature than the pellets P immediately after they exit the first die plate 325 and are cut by the cutting head 412, the water W can cool the pellets P such that the pellets P maintain their as-cut size and shape. Second, the flow of water W can carry the pellets P away from the cutting head 412 through the pelletizing system 310. Specifically, the flow of water W and pellets P can flow upwards along vertical direction 6 from the cutting chamber 422 and into an output line 424. The output line 424 can extend from the cutting chamber 422 to a slurry output 428. From the slurry output 428, the mixture of pellets P and water W can flow to a pellet dryer (not shown), which can function to separate the water W from the pellets P, providing the operator of the pelletizing system 310 with a supply of substantially dry pellets P.

As stated above, the first die plate 325 can comprise a body 328, as well as a plurality of passages 331 extending through the body 328 along the longitudinal direction 2. In the depicted embodiment, the passages 331 are positioned in a substantially ring-like arrangement, though in other embodiments it is contemplated that the passages 331 can be alternatively situated. The passages 331 can define substantially cylindrical, elongate bores that can be designed so as to correspond in diameter to the intended diameter of the pellets P produced by the pelletizing system 310. As a result, the passages 331 can have alternative sizes and/or shapes so as to produce pellets P having other sizes. Further, though the first die plate 325 is shown as defining a particular number of passages 331, the first die plate 325 can define any number of passages in other embodiments.

The first die plate 325 can further define a plurality of bores 334 extending radially through the outer surface of the body 328 of the first die plate 325. Each of the bores 334 can be spaced apart about the circumference of the first die plate 325, though other positions for the bores 334 are contemplated. The bores 334 can be configured to each receive a fastener 335 so as to secure the first die plate 325 to the frame 375 of the die plate changing system 370, where the frame 375 will be described further below. The fasteners 335 can be bolts, screws, pins, or any conventional fastener capable of extending through respective bores 334 so as to releasably couple the first die plate 325 to the frame 375. In contrast with the first and second die plates 25, 50, which are configured to be heated through receiving a flow of heated oil, the first die plate 325 can define a plurality of cartridge passages 337 extending radially through the outer surface of the body 328, where each cartridge passage 337 is configured to receive a respective heating cartridge 388. The heating cartridges 388 can be various types of electrical heating cartridges. When powered, the heating cartridges 388 can be configured to heat the first die plate 325 prior to and after placement into fluid communication with the diverter valve 314 and the pelletizer 400. As shown, the outer circumference of the body 328 defines an alternating arrangement of bores 334 and cartridge passages 337. However, it is contemplated that other arrangements and numbers of bores 334 and cartridge passages 337 can be utilized.

The pelletizing system 310 can also include a second die plate 350. The second die plate 350 can comprise a body 358, as well as a plurality of passages 361 extending through the body 358 along the longitudinal direction 2. In the depicted embodiment, the passages 361 are positioned in a substantially ring-like arrangement, though in other embodiments it is contemplated that the passages 361 can be alternatively situated. The passages 361 can define substantially cylindrical, elongate bores that can be designed so as to correspond in diameter to the intended diameter of the pellets P produced by the pelletizing system 310. As a result, the passages 361 can have alternative sizes and/or shapes so as to produce pellets P having other sizes. Further, though the second die plate 350 is shown as defining a particular number of passages 361, the second die plate 350 can define any number of passages in other embodiments.

The second die plate 350 can further define a plurality of bores 364 extending radially through the outer surface of the body 358 of the second die plate 350. Each of the bores 364 can be spaced apart about the circumference of the second die plate 350, though other positions for the bores 364 are contemplated. The bores 364 can be configured to each receive a fastener 335 so as to secure the second die plate 350 to the frame 375 of the die plate changing system 370. Like the first die plate 325, the second die plate 350 can define a plurality of cartridge passages 367 extending radially through the outer surface of the body 358, where each cartridge passage 367 is configured to receive a respective heating cartridge 388. When powered, the heating cartridges 388 can be configured to heat the second die plate 350 prior to and after placement into fluid communication with the diverter valve 314 and the pelletizer 400. As shown, the outer circumference of the body 358 defines an alternating arrangement of bores 364 and cartridge passages 367. However, it is contemplated that other arrangements and numbers of bores 364 and cartridge passages 367 can be utilized.

Continuing with FIGS. 6A-8, the die plate changing system 370 will be described in greater detail. The die plate changing system 370 can be configured to hold the first and second die plates 325, 350 and electively transition the first and second die plates 325, 350 into and out of communication with the diverter valve 314. The die plate changing system 370 can include a frame 375, where the frame 375 has a body 378. The body 378 can define a first recess 382a and a second recess 382b extending into the body 378. The first recess 382a is configured to receive the first die plate 325, and the second recess 382b is configured to receive the second die plate 350. Portions of the first and second recesses 382a, 382b can extend completely through the body 378 such that the flow of liquid material L can flow through the passages 331, 361 of one of the first and second die plates 325, 350 when the first and second die plates 325, 350 are disposed within the first and second recesses 382a, 382b. Further, each of the heating cartridges 388 can extend through the frame 375 and at least partially into one of the first and second die plates 325, 350, such that the plurality of heating cartridges 388 are configured to heat the frame 375 as well as the first and second die plates 325, 350.

The one of the first and second die plates 325, 350 that is in fluid communication with the diverter valve 314 and the pelletizer 400 during a pelletizing operation can be configured to couple the frame 375 and the first and second die plates 325, 350 to the diverter valve 314. Specifically, the first die plate 325 can define a plurality of bores 396a that are each configured to receive a fastener 398 so as to couple the frame 375 and the first die plate 325 to the diverter valve 314. Similarly, the second die plate 350 can define a plurality of bores 396b that are each configured to receive a fastener 398 so as to couple the frame 375 and the second die plate 350 to the diverter valve 314. The fasteners 398 can be bolts, or any other type of conventional fastener capable of releasably coupling the first and second die plates 325, 350 to the diverter valve 314. Further, though a certain number and configuration of bores 396a, 396b are depicted, the bores 396a, 396b can be otherwise design and/or arranged as desired.

Like the pelletizing system 10, during operation of the pelletizing system 310, only one of the first and second die plates 325, 350 is in fluid communication with the diverter valve 314 and the pelletizer 400. In previous pelleting systems, the system would have to be disassembled in order to service and/or replace a die plate. In the pelletizing system 310, the die plate changing system 370 can easily transition between positioning the first die plate 325 and the second die plate 350 in fluid communication with other aspects of the pelletizing system 310. To do this, the die plate changing system 370 can include a movement assembly 430 operably coupled to the frame 375 and configured to selectively move the frame 375 between multiple positions. For example, the movement assembly 430 can be configured to move the frame 375 between a first position, where the first die plate 325 is configured to receive the liquid material from the diverter valve 314, and a second position, where the second die plate 350 is configured to receive the material from the diverter valve 314. The first position is explicitly shown in FIGS. 6A-8.

The movement assembly 430 of the pelletizing system 310 is configured to rotate the frame 375 between the first and second positions. To do this, the movement assembly 430 can comprise a support structure 438 and a pivot 434 coupled to the frame 375 and the support structure 438. The support structure 438 is depicted as a metal beam, though other types of support structures 438 are contemplated. The pivot 434 can be configured to extend through a pivot bore 399 defined by the frame 375 so as to selectively rotate the frame between the first and second positions. The pivot 434 can be configured to rotate the frame 375 about an axis that is substantially parallel to the longitudinal direction 2, though other orientations for this axis are contemplated. In one embodiment, the frame 375 is configured to be manually transitioned between the first and second positions. However, it is also contemplated that the die plate changing system 370 can include automated means for transitioning the frame 375 between the first and second positions, such as a motor.

Figure 9:
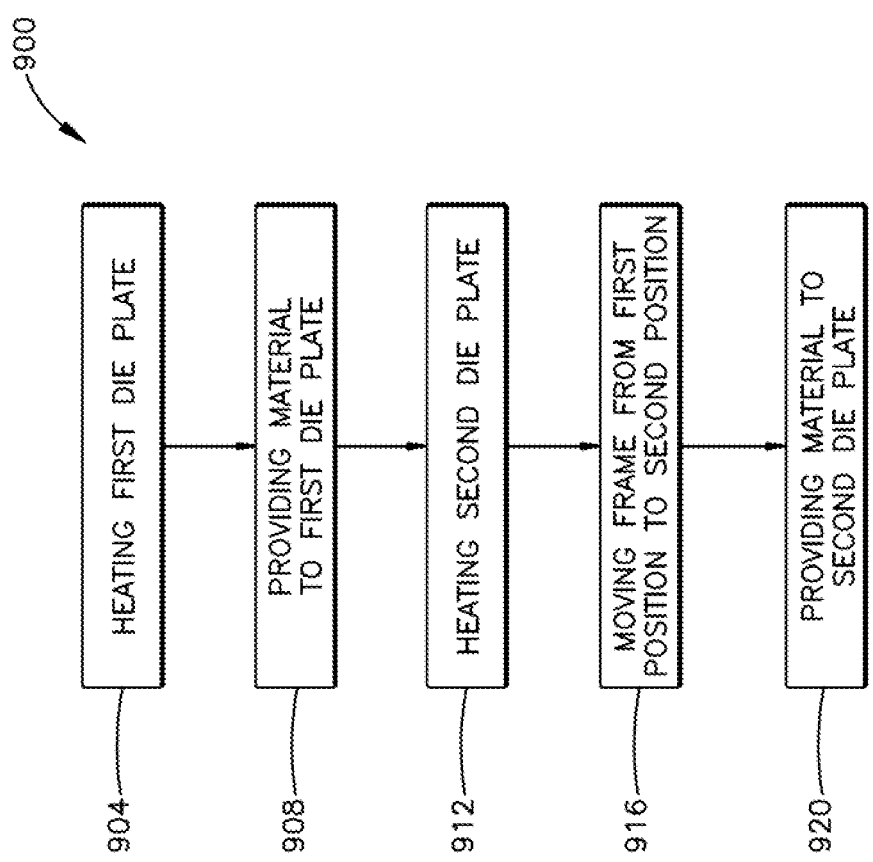
FIG. 9 is a process flow diagram of a method of changing die plates in a pelletizing system according to an embodiment of the present disclosure.

Now referring to FIG. 9, a method of changing die plates 25, 50, 325, 350 in a pelletizing system 10, 310 will be described. The method 900 begins with step 904, which includes heating a first die plate 25, 325 within a frame 75, 375. Heating the first die plate 25 in step 904 can comprise providing a heated liquid to the first die plate 25. Alternatively, heating the first die plate 325 in step 904 can comprise powering the heating cartridges 388. After step 904, in step 908 the material is provided to the first die plate 25, 325 from a diverter valve 14, 314 when the frame 75, 375 is in a first position. Then, in step 912, the second die plate 50, 350 is heated within the frame 75, 375. After step 912, step 916 involves moving the frame 75, 375 from the first position to a second position. In one embodiment, moving the frame 75 comprises linearly translating the frame from the first position to the second position. Moving the frame 75, 375 in step 916 can be performed manually. Alternatively, moving the frame 75 in step 916 can be performed automatically using a motor 212. Further, moving the frame 375 can comprise rotating the frame 375 from the first position to the second position. Then step 920 is performed, which includes providing the material to the second die plate 50, 350. Step 920 can comprise providing the heated liquid to the second die plate 50. Alternatively, step 920 can comprise powering the plurality of heating cartridges 388.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated. While the invention is described herein using a limited number of embodiments, these specific embodiments are not intended to limit the scope of the invention as otherwise described and claimed herein. The precise arrangement of various elements and order of the steps of articles and methods described herein are not to be considered limiting.

What is claimed is:

1. A die plate changing system configured to hold first and second die plates and selectively transition the first and second die plates into and out of communication with a material source, the die plate changing system comprising:
a frame having a body defining a first recess configured to receive the first die plate and a second recess configured to receive the second die plate, wherein the first and second die plates are disposed in the first and second recesses, respectively, and are heated; and
a movement assembly operably coupled to the frame and configured to selectively move the frame linearly along a direction between a first position, where the first die plate is configured to receive material from the material source, and a second position, where the second die plate is configured to receive the material from the material source, whereby the first position of the frame and the second position of the frame are offset from one another along the direction.

2. The die plate changing system of claim 1, wherein the frame is configured to heat the first and second die plates when the first and second die plates are disposed in the first recess and the second recess, respectively.

3. The die plate changing system of claim 2, wherein the frame includes a first input, a first input passage extending from the first input to the first recess, a second input, and a second input passage extending from the second input to the second recess,
wherein the first input passage is configured to receive a heated liquid from the first input and supply the first die plate with the heated liquid, and the second input passage is configured to receive the heated liquid from the second input and configured to supply the second die plate with the heated liquid.

4. The die plate changing system of claim 3, wherein the frame includes a first output, a first output passage extending from the first recess to the first output, a second output, and a second output passage extending from the second recess to the second output,
wherein the first output passage is configured to receive the heated liquid from the first die plate and direct the heated liquid to the first output, and the second output passage is configured to receive the heated liquid from the second die plate and direct the heated liquid to the second output.

5. The die plate changing system of claim 4, further comprising:
a first valve in fluid communication with the first input and configured to selectively prevent the heated liquid from flowing to the first input; and
a second valve in fluid communication with the second input and configured to selectively prevent the heated liquid from flowing to the second input.

6. The die plate changing system of claim 5, further comprising:
a third valve in fluid communication with the first output and configured to selectively prevent the heated liquid from flowing through the third valve; and a fourth valve in fluid communication with the second output and configured to selectively prevent the heated liquid from flowing through the fourth valve.

7. The die plate changing system of claim 1, further comprising:
a support structure,
wherein the movement assembly comprises a linear track coupled to the support structure, and wherein the frame is configured to selectively move along the linear track between the first and second positions.

8. The die plate changing system of claim 7, wherein the frame is configured to be manually transitioned between the first and second positions.

9. The die plate changing system of claim 7, further comprising:
a motor operatively connected to the frame, wherein the motor is configured to move the frame along the linear track between the first and second positions.

10. The die plate changing system of claim 1, wherein the frame defines a plurality of bores configured to receive a plurality of fasteners that are configured to secure the first and second die plates to the frame.

11. The die plate changing system of claim 1, wherein the frame defines a plurality of bores configured to receive a plurality of fasteners that are configured to secure the frame to the material source.

12. The die plate changing system of claim 1, further comprising:
a plurality of heating cartridges configured to extend through the frame and at least partially into one of the first and second die plates, such that the plurality of heating cartridges are configured to heat the frame and the first and second die plates.

13. A pelletizing system comprising:
the die plate changing system of claim 1; and
a pelletizer, wherein the pelletizer is linearly movable away from the frame of the die plate changing system.

14. The pelletizing system of claim 13, further comprising:
tracks that the pelletizer is positioned on, wherein the pelletizer is configured to move along the tracks when the pelletizer is not coupled to the frame.

15. The die plate changing system of claim 1, wherein the direction is a lateral direction, and wherein the first die plate is configured to direct the material received by the first die plate from the material source along a longitudinal direction that is orthogonal to the lateral direction, when then frame is in the first position.

16. A method of changing die plates in a pelletizing system, the method comprising:
heating a first die plate;
providing a material to the first die plate when a frame is in a first position;
heating a second die plate;
moving the frame linearly along a direction from the first position to a second position; and
providing the material to the second die plate when the frame is in the second position, whereby the first position of the frame and the second position of the frame are offset from one another along the direction.

17. The method of claim 16, wherein the heating the first die plate comprises heating the first die plate within the frame, and the heating the second die plate comprises heating the second die plate within the frame.

18. The method of claim 16, wherein:
the heating the first die plate comprises providing a heated liquid to the first die plate; and
the heating the second die plate comprises providing the heated liquid to the second die plate.

19. The method of claim 16, wherein the direction is a lateral direction that is orthogonal to a longitudinal direction that the material provided to the first die plate flows along when flowing through the first die plate, and wherein moving the frame comprises linearly translating the frame from the first position to the second position.

20. The method of claim 16, wherein moving the frame comprises manually moving the frame.

21. The method of claim 16, wherein moving the frame comprises automatically moving the frame using a motor.

22. The method of claim 16, wherein:
the heating the first die plate comprises powering a plurality of heating cartridges; and
the heating the second die plate comprises powering the plurality of heating cartridges.

* * * * *